United States Patent
Dettinger et al.

(10) Patent No.: US 7,363,297 B2
(45) Date of Patent: Apr. 22, 2008

(54) UTILIZATION OF LOGICAL FIELDS WITH CONDITIONAL CONSTRAINTS IN ABSTRACT QUERIES

(75) Inventors: Richard D. Dettinger, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 11/038,707

(22) Filed: Jan. 20, 2005

(65) Prior Publication Data

US 2006/0161568 A1    Jul. 20, 2006

(51) Int. Cl.
G06F 7/00    (2006.01)
(52) U.S. Cl. .......................................... 707/3
(58) Field of Classification Search .................. 707/3, 707/4
See application file for complete search history.

(56) References Cited

U.S. PATENT DOCUMENTS

| | | | |
|---|---|---|---|
| 5,926,807 A * | 7/1999 | Peltonen et al. ............... | 707/3 |
| 6,725,227 B1 | 4/2004 | Li | |
| 6,813,617 B2 * | 11/2004 | Wong et al. ................... | 707/4 |
| 2005/0076015 A1 * | 4/2005 | Dettinger et al. .............. | 707/3 |
| 2005/0091197 A1 * | 4/2005 | Dettinger et al. .............. | 707/3 |
| 2005/0091198 A1 * | 4/2005 | Dettinger et al. .............. | 707/3 |

OTHER PUBLICATIONS

U.S. Appl. No. 10/083,075, "Application Portability and Extensibility Through Database Schema and Query Abstraction", filed Feb. 26, 2002.

* cited by examiner

Primary Examiner—Chong H Kim
(74) Attorney, Agent, or Firm—Patterson & Sheridan, LLP

(57) ABSTRACT

Methods, systems, and articles of manufacture are provided for enhancing abstract queries by utilizing logical fields with conditional constraints. Building abstract queries with logical fields configured with conditional constraints allows for optimized physical queries to be generated from corresponding abstract queries.

5 Claims, 10 Drawing Sheets

UTILIZATION OF LOGICAL FIELDS WITH CONDITIONAL CONSTRAINTS IN ABSTRACT QUERIES

CROSS-REFERENCE TO RELATED APPLICATIONS

The present application is related to commonly owned, co-pending U.S. patent application Ser. No. 10/083,075, filed Feb. 26, 2002, entitled "Application Portability And Extensibility Through Database Schema And Query Abstraction", which is incorporated herein by reference.

BACKGROUND OF THE INVENTION

1. Field of the Invention

The present invention generally relates to data processing and more particularly to utilizing logical fields with conditional constraints in abstract queries.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) and application programming interfaces (API's) such as Java® Database Connectivity (JDBC). The term "query" denominates a set of commands for retrieving data from a stored database. Queries take the form of a command language, such as SQL, that lets programmers and programs select, insert, update, find out the location of data, and so forth.

Unfortunately, generating queries using SQL may require a detailed understanding of the possibly complex physical layout of the underlying database and interpretation of cryptic field names. For some applications, to facilitate the query building process, an abstraction model may be utilized that, in effect, hides some of the complexities of the underlying database physical layout from users. The abstraction model may include logical fields with recognizable names that map to corresponding physical fields of the underlying database. "Abstract" queries may be generated containing conditions based on the logical fields. Upon issuance, the logical fields of an abstract query may be mapped to corresponding physical fields to create a physical or "concrete" query. For some applications, abstract queries may be saved, allowing subsequent users to reuse the saved abstract queries without having to generate their own. The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety.

Abstract queries often contain a conditional element (e.g., a WHERE clause in a corresponding SQL statement) in which a logical field is used within an expression with a comparison operator. As described in the related application Ser. No. 10/083,075, logical fields are typically mapped to a particular physical field in a physical database. For instance, if the physical database was implemented as a relational database, a particular logical field would be mapped to a particular column within a relational table.

An advantage of abstraction is that users are able to create complex queries in order to retrieve desired results. Unfortunately, complex abstract queries translate to extremely elaborate physical queries that join numerous database tables in a complex manner to assemble the required result set. Such physical queries require a large amount of system resources to execute.

Generally, the DBMS includes a query optimizer component configured to determine the manner in which queries will be processed. The primary task of the optimizer is to determine the most efficient way to execute each particular query against a database. To this end, the optimizer typically determines an access plan for use in executing the query against the database. In general, the access plan contains low-level information indicating precisely what steps the system is to take to execute the query. Commonly, the access plan calls for the order in which tables are joined and the use of one or more indexes carefully designed to speed execution of the query. The inclusion or exclusion of joins between particular tables can have a tremendous impact on query performance.

Therefore what is needed is an improved process for constructing optimized abstract queries that can be converted into more efficient physical queries.

SUMMARY OF THE INVENTION

The present invention is generally directed to methods, systems and articles of manufacture building and using abstract queries with logical fields configured with conditional constraints.

One embodiment provides a computer implemented method for retrieving data including providing a plurality of conditional constraints, each based on a correlation between at least a respective first condition and a respective second condition each defined on the basis of a respective field related to a respective value according to a respective operator. Each of the plurality of conditional constraints causes the programmatic addition of the respective second condition to each query satisfying the respective conditional constraint. A query satisfies a conditional constraint if the query contains the first condition specified by the conditional constraint. Upon receiving a query, the method determines, for each conditional constraint of the plurality of conditional constraints, whether the query satisfies the conditional constraint. If the query satisfies the conditional constraint, the respective second condition corresponding to the satisfied conditional constraint is added to the query to produce a modified query.

Another embodiment provides a computer readable medium containing a program which, when executed, performs operations for retrieving data. In response to receiving a query, the operation determines whether the query satisfies at least one of a plurality of conditional constraints, each based on a correlation between at least a respective first condition and a respective second condition each defined on the basis of a respective field related to a respective value according to a respective operator. The plurality of conditional constraints each causes the programmatic addition of the respective second condition to each query satisfying the respective conditional constraint. A query satisfies a conditional constraint if the respective query contains the first condition specified by the conditional constraint. For each conditional constraint satisfied, the respective second condition corresponding to the satisfied conditional constraint is added to the received query to produce a modified query.

Another embodiment provides a data processing system for retrieving data, including a database management system for retrieving data from a data repository in response to queries and a plurality of conditional constraints. Each conditional constraint is based on a correlation between at least a respective first condition and a respective second condition each defined on the basis of a respective field related to a respective value according to a respective operator, and wherein each of the plurality of conditional constraints causes the programmatic addition of the respective second condition to each query satisfying the respective conditional constraint. A query satisfies a conditional constraint if the query contains the first condition specified by the conditional constraint.

Still another embodiment provides a computer implemented method for defining conditional constraints a field for use in a query. A first query is issued to retrieve distinct values for a first field. Results for the first query, including the distinct values for the first field, are received. For each of the distinct values for the first field, a second query is issued. The second query is configured to retrieve, for a second field, a result set that satisfies a first condition comprising the first field related to the distinct value by an operator. For each instance of the second query with a different respective distinct value of the first field in a respective first condition the method determines whether a correlation exists between (i) the respective distinct value of the first field and (ii) a respective result set value of the second field. If a correlation exists, a conditional constraint is defined for the first field based on the correlation, wherein the conditional constraint specifies the addition of a second condition to a query if the query includes the respective first condition, wherein the second condition includes the second field related to the respective result set value by an operator.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
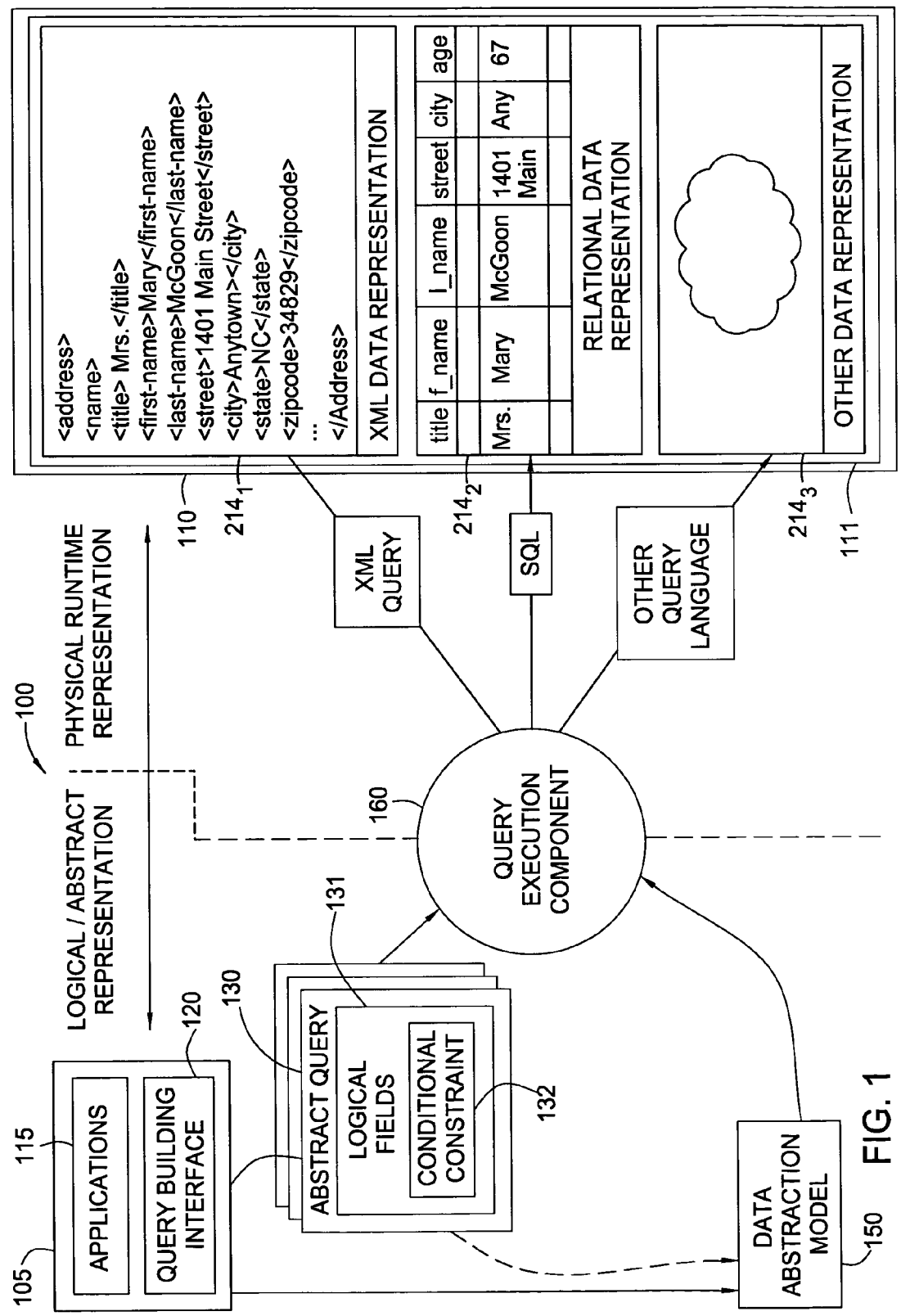
FIG. 1 is a relational view of software and hardware components of one embodiment of the invention.

The present invention is generally directed to methods, systems and articles of manufacture for enhancing abstract queries by utilizing logical fields with conditional constraints.

Further, in the following, reference is made to embodiments of the invention. The invention is not, however, limited to specific described embodiments. Instead, any combination of the following features and elements, whether related to different embodiments or not, is contemplated to implement and practice the invention. Furthermore, in various embodiments the invention provides numerous advantages over the prior art. Although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Similarly, reference to "the invention" shall not be construed as a generalization of any inventive subject matter disclosed herein and shall not be considered to be an element or limitation of the appended claims, except where explicitly recited in a specific claim.

As used herein, the term user may generally apply to any entity utilizing the data processing system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

As used herein, the term database generally refers to a collection of data arranged for ease and speed of search and retrieval. While the following description focuses on transaction statements (such as queries) for relational databases, those skilled in the art will recognize the methods described herein may be used with any type of database including an object-relational database and an XML-based database.

In one embodiment of a data abstraction model, users may compose an abstract query using a set of logical fields defined by a data abstraction layer. The data abstraction layer, along with an abstract query interface, provide users with an abstract view of the data available to query (e.g., search, select, and modify). The data itself is stored in a set of underlying physical databases using a concrete physical representation (e.g., a relational database). The physical representation may include a single computer system, or may comprise many such systems accessible over computer networks. The data abstraction layer provides a logical view of one or more such underlying data repositories that is independent of the particular manner of data representation. Where multiple data sources are provided, each logical field may be configured to include a location specification identifying the location of the data to be accessed. A runtime component is configured to resolve an abstract query into a form that can be issued against the underlying physical data repositories.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed across communications media, (e.g., a computer or telephone network) including wireless communications. The latter embodiment specifically includes information downloaded from the internet and other networks. Such signal-bearing media, when carrying computer-readable instructions that perform methods of the present invention, represent embodiments of the present invention.

In general, the routines executed to implement the embodiments of the invention, may be part of an operating system or a specific application, component, program, module, object, or sequence of instructions. The software of the present invention typically is comprised of a plurality of instructions capable of being performed using a computer system. Also, programs typically also include variables and data structures that reside in memory or on storage devices as part of their operation. In addition, various programs described hereinafter may be identified based upon the application for which they are implemented in a specific embodiment of the invention. Those skilled in the art will recognize, however, that any particular nomenclature that follows is used merely for convenience, and thus does not limit the invention for use solely in any specific application identified or implied by such nomenclature. Furthermore, the functionality of programs described herein uses discrete modules or components interacting with one another. Those skilled in the art will recognize that different embodiments may combine or merge the components and modules described herein in many different ways.

An Exemplary System

FIG. 1 illustrates a relational view of hardware and software components of a data processing system 100 in accordance with one embodiment of the invention. The system 100 illustratively includes a client computer system 105 comprising a variety of applications including a query building interface 120 for accessing data in a database 111, via a database management system (DBMS) 110. As illustrated, the database 111 may accommodate data in a variety of different physical representations 214, such as extensible markup language (XML) representation 2141, relational representation 2142, or some other data representation 2143.

The system 100 may include a data abstraction model (DAM) 150 that, in effect, shields a user from the details of the particular physical representation of the database 111. The DAM 150, also referred to as a data repository abstraction (DRA) in related applications, may define a set of logical fields that map to underlying physical fields of the underlying database 111. Users may be able to create abstract queries based on the logical fields, via the query building interface 120. Upon issuance of abstract queries, a query execution component 160 may convert an abstract query into a physical or "concrete" query suitable for issuance against the database 111 by mapping logical fields of the abstract query to physical fields of the particular physical representation 214, based on the field definitions in the DAM 150.

Additionally, embodiments of the present invention allow for a particular logical field 131 to be defined with a conditional constraint 132. As will be described with reference to the following figures and examples, conditional constraints 131 are based on correlations between values of two logical fields 131. Consider the following abstract query: Find Name Under Conditions Test A Results=200. In this case, Test A Results is a logical field used in the conditional portion of the abstract query. Suppose that data analysis indicates that for all instances of patients' tests where Test A Results is 200, the Gender of the patient is male. A correlation can be made between the Test A Results and Gender logical fields. More specifically, a correlation can be made between the expressions "Test A Results=200" and "Gender=Male". Embodiments of the present invention allow for a conditional constraint 132 to be defined for the field Test A Results so that when the expression Test A Results=200 appears in the conditional portion of an abstract query, the conditional constraint expression Gender=Male will automatically be added to the abstract query.

As mentioned earlier, embodiments of the present invention allow for logical fields to be sourced from different tables. For instance, the Test A Results field may represent data from a column in a Tests physical table and the Gender field may represent data from a Patient physical table. Suppose the Test table is substantially larger than the Patients table (e.g., millions of rows vs. hundreds of rows). In this case, including the Gender=Male conditional constraint expression in the original query results in a physical query that joins the Tests table and the Patients table. Such a join is advantageous because it provides the database optimizer more information for executing the query more efficiently. For example, for the above query, the optimizer can circumvent all the Test records for female patients, which could possibly be millions of records. Avoiding the need to sift through millions of records in this manner can yield significant improvements in query performance.

Figure 2:
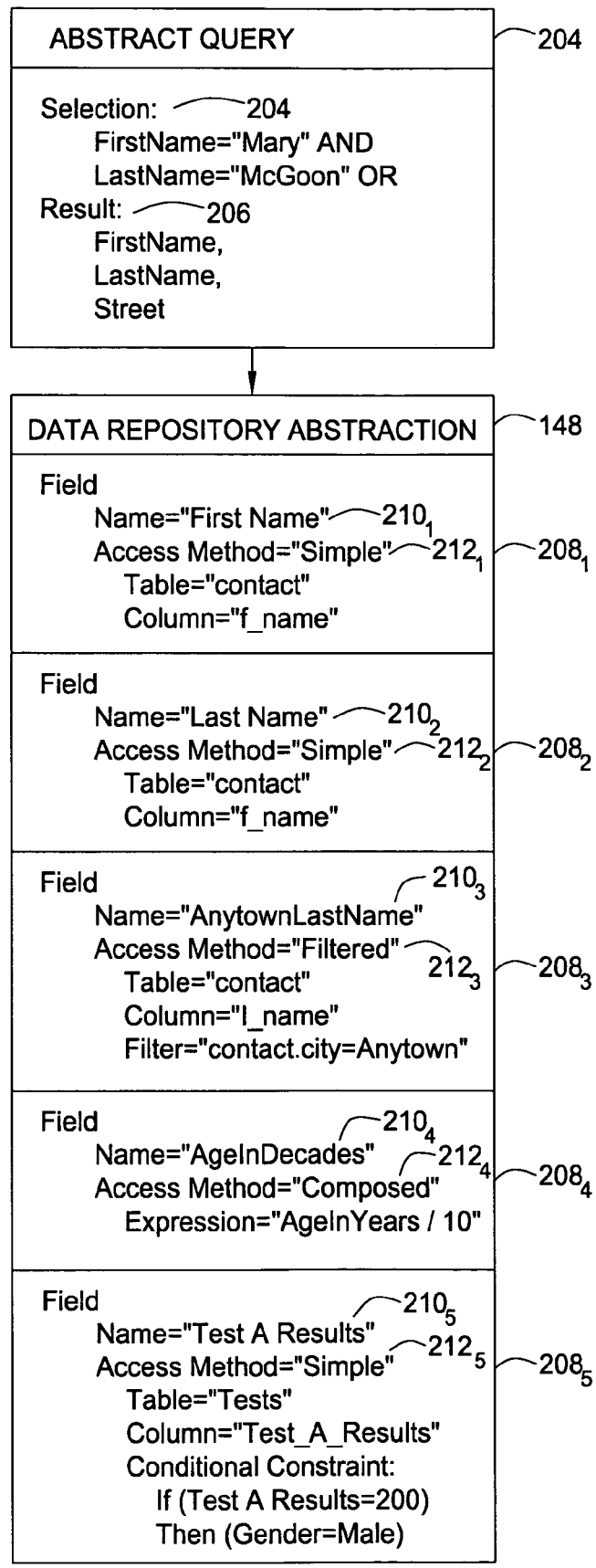
FIG. 2 illustrates an abstract query and corresponding data repository abstraction component, according to one embodiment of the invention.

FIG. 2 illustrates one embodiment of a component of the data abstraction model 150 that comprises a plurality of logical field specifications 2081-5 (five shown by way of example), collectively referred to as field specifications 208. Specifically, a field specification 208 is provided for each logical field 131 available for composition of an abstract query 130. Each field specification 208 identifies a logical field name 2101, 2102, 2103, 2104, 2105 (collectively, field name 210) and an associated access method 2121, 2142, 2123, 2124, 2125 (collectively, access method 212). The access methods map a logical field 130 to a particular physical data representation 2141, 2142 . . . 214N in a database (e.g., one of the databases 156). By way of illustration, two data representations are shown, an XML data representation 2141 and a relational data representation 2142. However, the physical data representation 214N indicates that any other data representation, known or unknown, is contemplated.

As shown in FIG. 2, the field specifications 2081, 2082 and 2085 exemplify simple field access methods 2121, 2122, and 2125, respectively. Simple fields are mapped directly to a particular entity in the underlying physical data representation (e.g., a field mapped to a given database table and column). By way of illustration, the simple field access method 2121 shown in FIG. 2 maps the logical field name 2101 ("FirstName") to a column named "f_name" in a table named "contact". The field specification 2083 exemplifies a filtered field access method 2123. Filtered fields identify an associated physical entity and provide rules used to define a particular subset of items within the physical data representation. An example is provided in FIG. 2 in which the filtered field access method 2123 maps the logical field name 2103 ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification 2084 exemplifies a composed field access method 2124. Composed access methods compute a logical field from one or more physical fields using an expression supplied as part of the access method definition. In this way, information which does not exist in the underlying data representation may be computed. In the example illustrated in FIG. 2 the composed field access method 2123 maps the logical field name 2103 "AgeInDecades" to "AgeInYears/10". Another example is a sales tax field that is composed by multiplying a sales price field by a sales tax rate.

Additionally, the "Test A Results" field specification 2085 lists syntax for defining a conditional constraint. The defined conditional constraint specifies that when the expression "Test A Results=200" is used in an abstract query, the expression "Gender=Male" should also be included.

By way of example, the field specifications 208 of the component of the data abstraction model 150 shown in FIG. 1 are representative of logical fields mapped to data represented in the relational data representation 2142. However, other instances of the data abstraction model 150 map logical fields to other physical data representations, such as XML. An illustrative abstract query corresponding to the abstract query 130 containing logical fields 131 illustrated in FIG. 1 is shown in Table I below. Again, in this example, the data abstraction model 150 is defined using XML.

TABLE I

QUERY EXAMPLE

| | |
|---|---|
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 | <Selection> |
| 006 | <Condition internalID="4"> |
| 007 | <Condition field="FirstName" operator="EQ" value="Mary" |
| 008 | internalID="1"/> |
| 009 | <Condition field="LastName" operator="EQ" value="McGoon" |
| 010 | internalID="3" relOperator="AND"></Condition> |
| 011 | </Condition> |

TABLE I-continued

QUERY EXAMPLE

| | |
|---|---|
| 012 | <Condition field="State" operator="EQ" value="NC" internalID="2" |
| 013 | relOperator="OR"></Condition> |
| 014 | </Selection> |
| 015 | <Results> |
| 016 | <Field name="FirstName"/> |
| 017 | <Field name="LastName"/> |
| 018 | <Field name="Street"/> |
| 019 | </Results> |
| 020 | </QueryAbstraction> |

The abstract query shown in Table I includes a selection specification (lines 005-014) containing selection criteria and a results specification (lines 015-020). In one embodiment, a selection criterion consists of a field name representing the logical field, a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a component of the data abstraction model 150 (defined using XML) corresponding to the abstract query in Table I is shown in Table II below. For this example, the data abstraction model is defined using XML. Lines 022-030 define the Test A Results field. The definition includes a conditional constraint which specifies that if the expression "Test A Results=200" appears in the conditional portion of an abstract query, the conditional constraint expression "Gender=Male" should also be included in the query.

TABLE II

DATA REPOSITORY ABSTRACTION EXAMPLE

| | |
|---|---|
| 001 | <?xml version="1.0"?> |
| 002 | <DataRepository> |
| 003 | <Category name="Demographic"> |
| 004 | <Field queryable="Yes" name="FirstName" displayable="Yes"> |
| 005 | <AccessMethod> |
| 006 | <Simple columnName="f_name" tableName="contact"></Simple> |
| 007 | </AccessMethod> |
| 008 | <Type baseType="char"></Type> |
| 009 | </Field> |
| 010 | <Field queryable="Yes" name="LastName" displayable="Yes"> |
| 011 | <AccessMethod> |
| 012 | <Simple columnName="l_name" tableName="contact"></Simple> |
| 013 | </AccessMethod> |
| 014 | <Type baseType="char"></Type> |
| 015 | </Field> |
| 016 | <Field queryable="Yes" name="State" displayable="Yes"> |
| 017 | <AccessMethod> |
| 018 | <Simple columnName="state" tableName="contact"></Simple> |
| 019 | </AccessMethod> |
| 020 | <Type baseType="char"></Type> |
| 021 | </Field> |
| 022 | <Field queryable="Yes" name="Test A Results" displayable="Yes"> |
| 023 | <AccessMethod> |
| 024 | <Simple columnName="state" tableName="contact"></Simple> |
| 025 | </AccessMethod> |
| 026 | <Type baseType="char"></Type> |

TABLE II-continued

DATA REPOSITORY ABSTRACTION EXAMPLE

| 027 | <Conditional Constraint= |
| 028 | "if data://demographic/test a results = 200 |
| 029 | then data://demographic/gender = male"/> |
| 030 | </Field> |
| 031 | </Category> |
| 032 | </DataRepository> |

Figure 3:
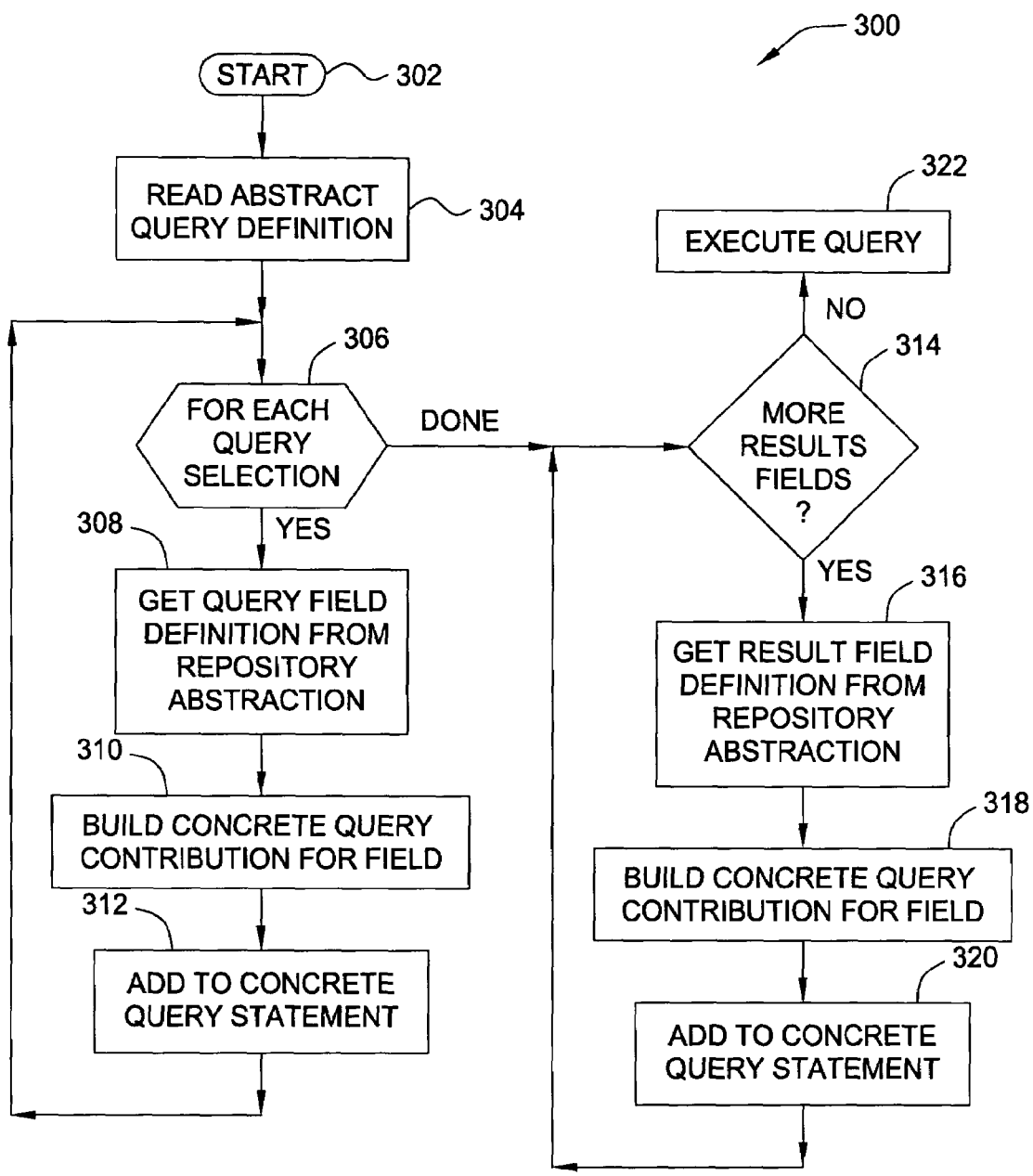
FIG. 3 is a flow chart illustrating the operation of a runtime component, according to one embodiment of the invention.

FIG. 3 shows an illustrative runtime method 300 exemplifying one embodiment of the operation of the query execution component 160. The method 300 processes an abstract query by mapping logical fields included in the abstract query to the underlying data using the access method specified for each query. Operations 300 begin at step 302 when the query execution component 160 receives as input an instance of an abstract query (such as the abstract query 130 shown in FIG. 1). At step 304, the query execution component 160 reads and parses the instance of the abstract query and locates individual selection criteria and desired result fields. At step 306, the query execution component 160 enters a loop (comprising steps 306, 308, 310 and 312) for processing each query selection criteria statement present in the abstract query, thereby building a data selection portion of a concrete query, also referred to herein as a physical query or executable query. In one embodiment, a selection criterion consists of a field name (for a logical field), a comparison operator (=, >, <, etc) and a value expression (what the field is being compared to).

At step 308, the query execution component 160 uses the field name from a selection criterion of the abstract query to look up the definition of the field in the data abstraction model 150. As noted above, the field definition includes a definition of the access method used to access the physical data associated with the field. The query execution component 160 then builds (step 310) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the database 111 shown in FIG. 1. The concrete query contribution generated for the current field is then added to a concrete query statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, query execution component 160 identifies the information to be returned as a result of query execution. As described above, in one embodiment, the abstract query defines a list of logical fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the query execution component 160 looks up a result field name (from the result specification of the abstract query) in the data abstraction model 150 and then retrieves a result field definition from the data abstraction model 150 to identify the physical location of data to be returned for the current logical result field. The query execution component 160 then builds (as step 318) a concrete query contribution (of the concrete query that identifies physical location of data to be returned) for the logical result field. At step 320, concrete query contribution is then added to the concrete query statement.

Figure 4:
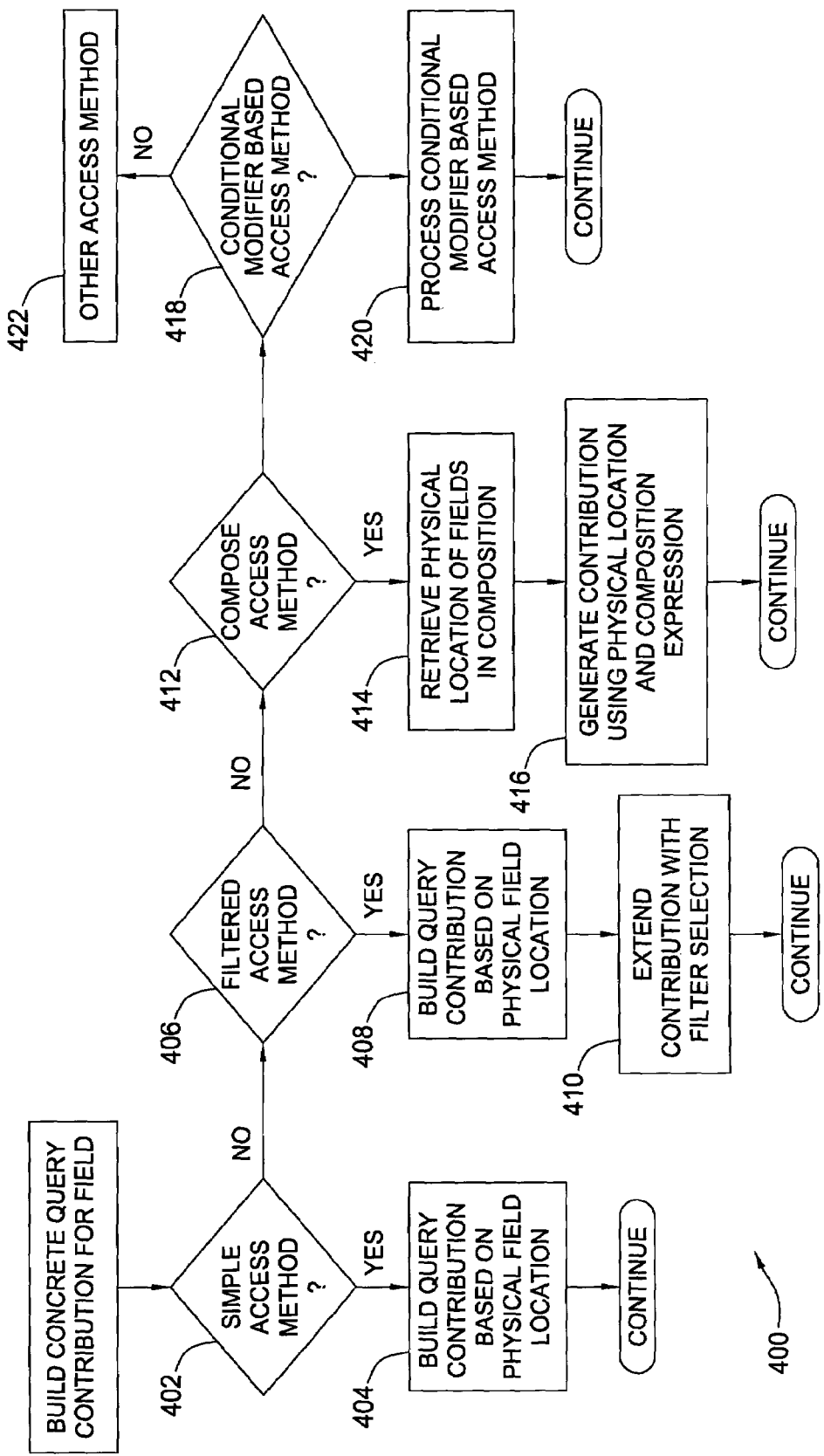
FIG. 4 is a flow chart further illustrating the operation of a runtime component, according to one embodiment of the invention.

One embodiment of a method 400 for building a concrete query contribution for a logical field according to steps 310 and 318 is described with reference to FIG. 4. At step 402, the method 400 queries whether the access method associated with the current logical field is a simple access method. If so, the concrete query contribution is built (step 404) based on physical data location information (step 405). Processing then continues according to method 300 described above. Otherwise, processing continues to step 406 to query whether the access method associated with the current logical field is a filtered access method. If so, the concrete query contribution is built (step 408) based on physical data location information for some physical data entity. At step 410, the concrete query contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the concrete query contribution is generated. Processing then continues according to method 300 described above.

If the access method is not a composed access method, processing proceeds from to step 417. Step 417 is representative of any other access method types contemplated as embodiments of the present invention. Those skilled in the art will recognize that embodiments are contemplated in which less then all the available access methods are implemented. For example, in a particular embodiment only simple access methods are used. In another embodiment, only simple access methods and filtered access methods are used.

Figure 5:
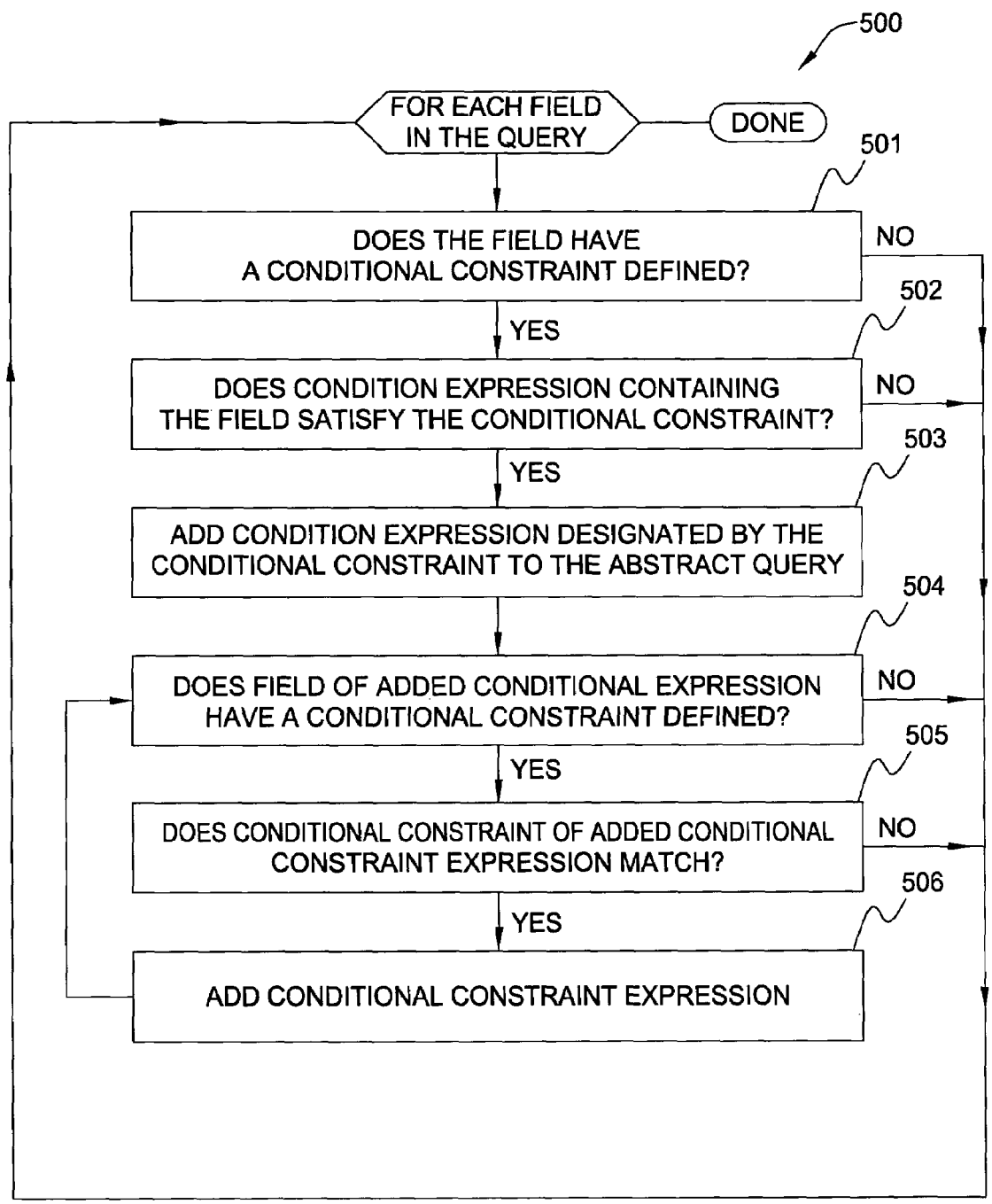
FIG. 5 is a flow chart illustrating operations for processing an abstract query which contains logical fields for which conditional constraints are defined.

In addition to the default access methods, embodiments of the present invention provide added functionality to accommodate the query contribution that will be made if a field is defined with a conditional constraint. It should be noted that the additional processing also analyzes the expression in which the respective field is used. FIG. 5 is a flow chart illustrating operations 500 for processing an abstract query which contains logical fields for which conditional constraints are defined. For each logical field in the conditional portion (i.e., the predicate or the WHERE clause) of the abstract query, the following steps are performed.

At step 501 it is determined if a conditional constraint has been defined for the field. If the field has a conditional constraint defined, at step 502 the expression in which the field is used within the conditional portion of the abstract query (i.e., the conditional expression) is compared to the conditional constraint expression. If the conditional expression matches the conditional constraint expression, at step 503 the conditional constraint expression is added to the conditional portion of the abstract query. At step 504 it is determined if the referenced field within the newly added conditional constraint expression itself has a conditional constraint defined. If the referenced field also has a conditional constraint defined, at step 505 it is determined if the referenced fields conditional constraint expression should be added to the abstract query. If the requirements of the referenced field's conditional constraint are met, at step 506 the conditional constraint expression corresponding to the referenced field is also added to the abstract query.

Steps 504-506 describe a recursive process to manage conditional constraints of fields contained within conditional constraint expressions; the following is a further description of the recursive aspect of operations 500. For instance, consider the following abstract query: Find Name, Age Under Conditions Test A Results=5. Suppose Test A Results has a conditional constraint defined for the expression Test A Results=20, which specifies that the conditional constraint condition Test B Results=1 should also be added as a conditional. Further suppose that the referenced field, Test B Results, has a conditional constraint defined for the expression Test B Results=1, which specifies that the constraint Test C Results=10 should be added as a conditional. Since the requirements for conditional constraint for Test B Results is met, the conditional constraint expression containing Test C Results is also added to the abstract query. Due to the conditional constraints, the abstract query presented earlier now takes the following form: Find Name, Age Under Conditions Test A Results=5, Test B Results=1, Test C Results=10.

An Exemplary Graphical User Interface

FIGS. 6A, 6B, 7A and 7B are exemplary graphical user interface (GUI) screens provided via a query builder interface and configured to allow users (e.g., data architects or administrators) to build and submit abstract queries. The abstract queries utilize logical fields which are defined with conditional constraints.

Figure 6A:
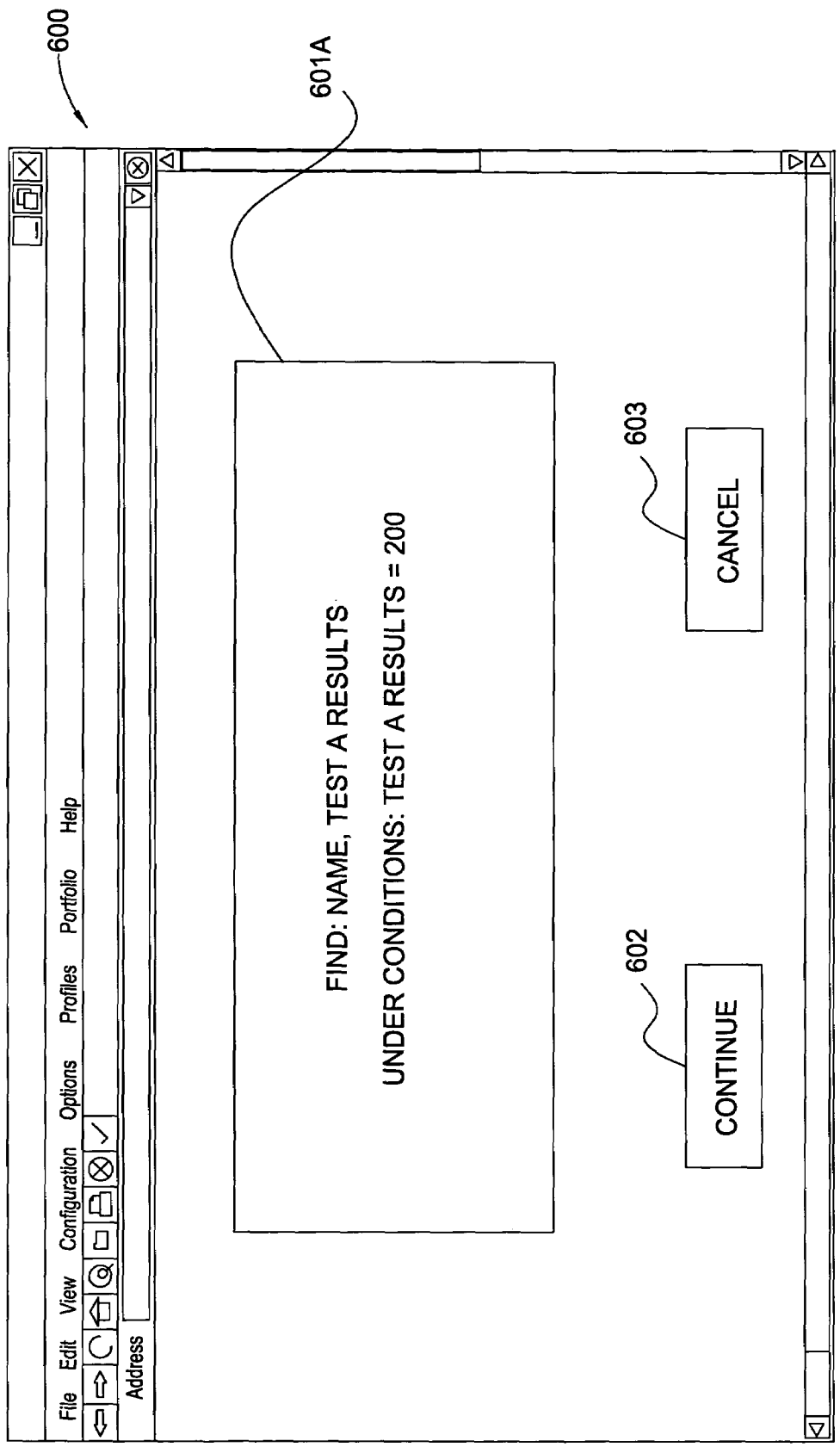
FIGS. 6A, 6B, 7A and 7B are exemplary graphical user interface (GUI) screens provided via a query builder interface and configured to allow users (e.g., data architects or administrators) to build and submit abstract queries.

FIG. 6A illustrates a screen that might be presented via a query building interface 120 during a query building session in which an abstract query is being constructed. A free-form text box 601A is provided to input and submit abstract queries. As shown in FIG. 6A, an abstract query is provided to retrieve the names of patients and their Test A results for all instances where the Test A Results value is equal to 200. If the user is satisfied with the input query, the Continue button 602 can be selected to submit the query to the query execution runtime 160. However, if the user desires to change the query or revert to a previous screen, the Cancel 603 button can be pushed to exit the current screen without saving changes.

Figure 6B:
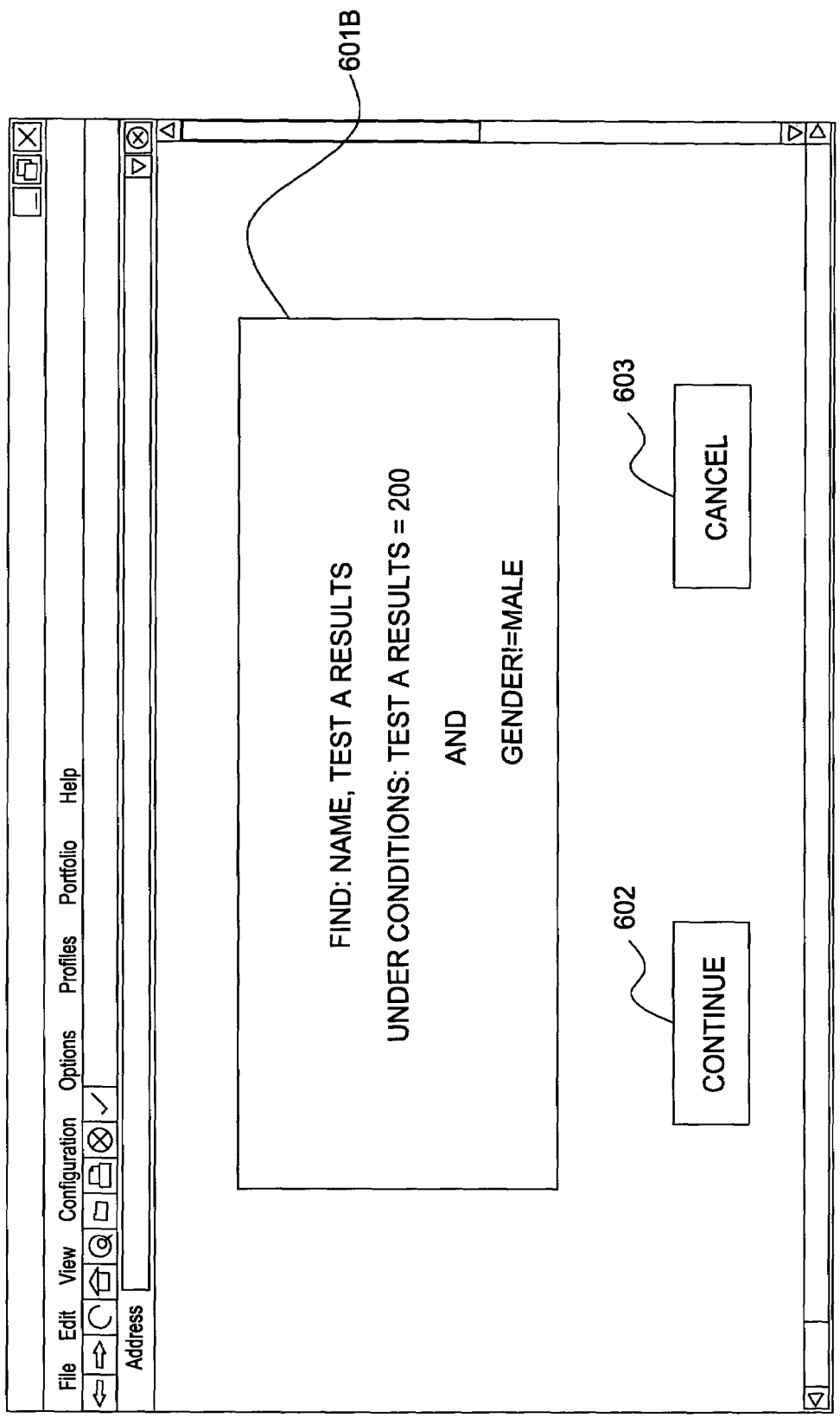

Upon submission of the query shown in box 601A in FIG. 6A, the query execution runtime 160 analyzes the query and determines if any of the logical fields in the conditional portion of the abstract query have conditional constraints defined. In the case of the example query of FIGS. 6A, the logical field Test A Results does have a conditional constraint defined, wherein the constraint specifies that if Test A Results=200, the expression Gender!=Male should be added to the original query. Accordingly, FIG. 6B is displayed to the user with text-box 601B showing the modified query. If the user is satisfied with the query (specifically, with the addition of the conditional constraint expression) the Continue button 602 can be pushed to proceed with processing the abstract query and ultimately submitting a corresponding physical query to database management system.

As stated earlier, in some cases the field in the conditional constraint expression may itself have a conditional constraint defined. For instance, in the current example, a conditional constraint may be defined for the GENDER field. If a conditional constraint does exist for GENDER, it is compared with the expression GENDER!=Male; if there is a match, the conditional constraint expression for GENDER is added to the abstract query.

Figure 7A:
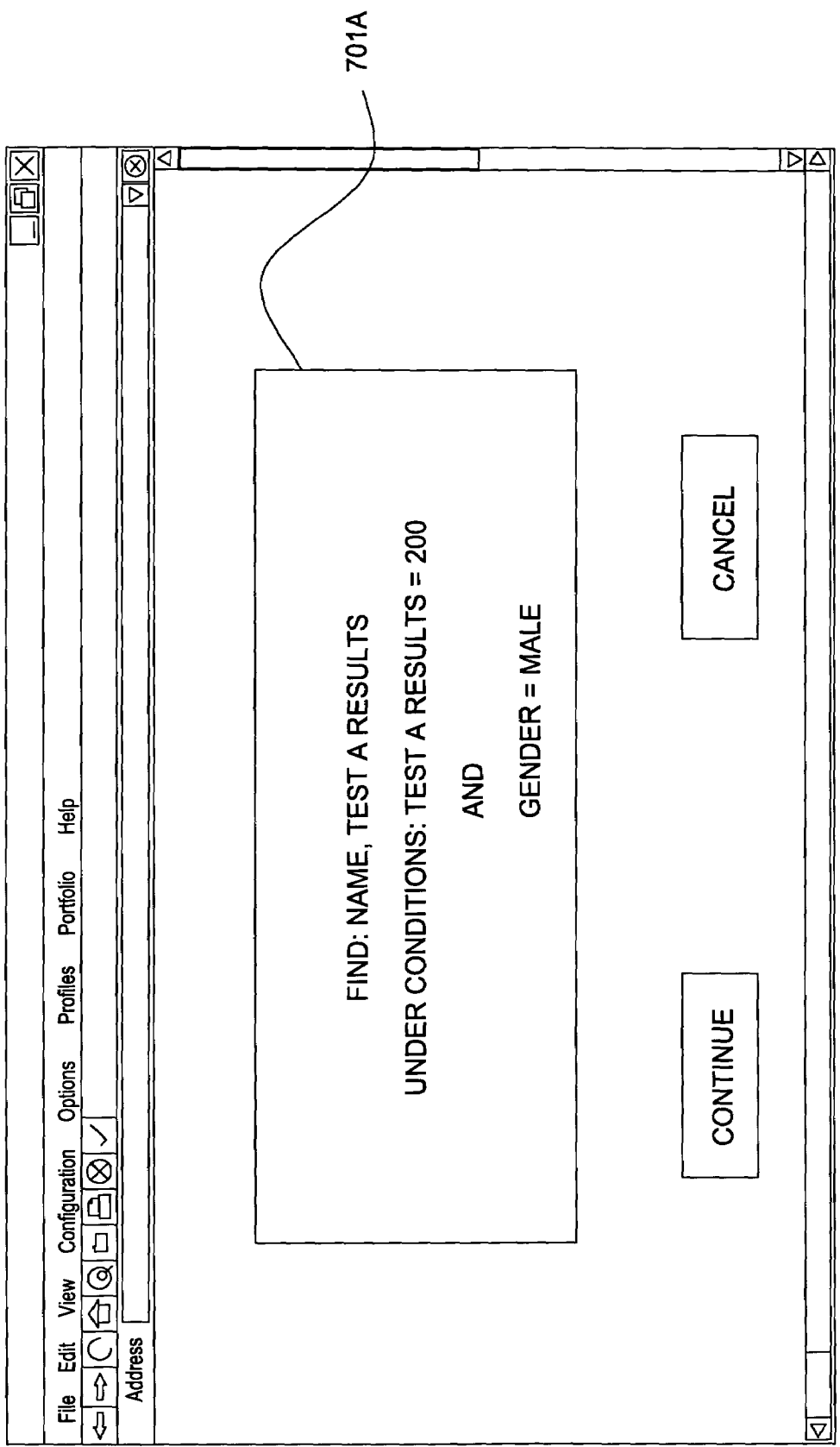
Figure 7B:
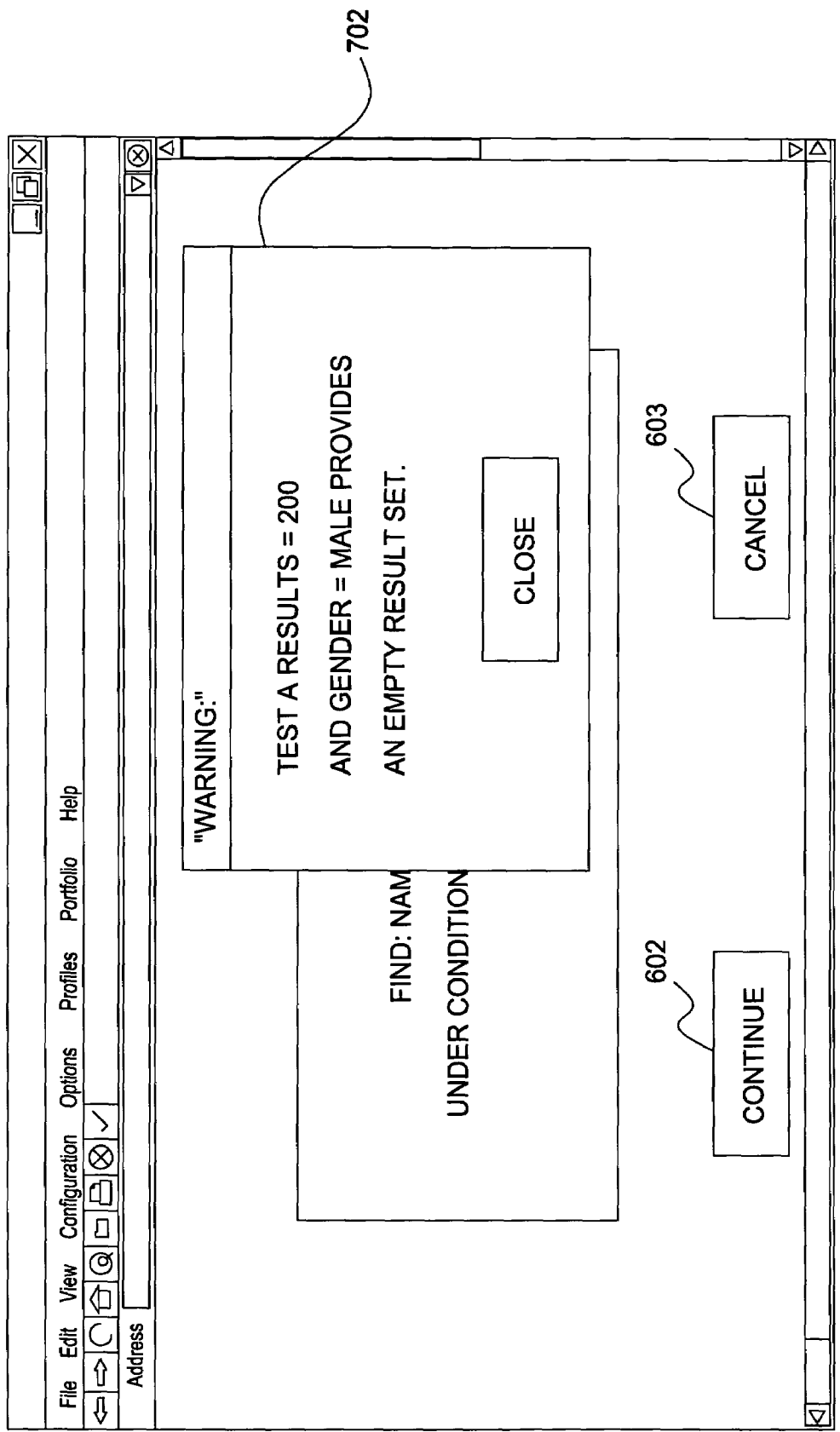

Aside from improving query execution performance, embodiments of this invention can be used to provide functionality to assist the user during the query building process. For instance, conditional constraints may be used to provide suggestions and warnings to users regarding certain combinations of expressions in the conditional portion of abstract queries. FIG. 7A provides another abstract query which utilizes the field Test A Results within the expression Test A Results=200. Suppose the conditional constraint for Test A Results (i.e., Gender!=Male) is still in place. Further suppose a user has input the abstract query seen in free-form text box 701A shown in FIG. 7A. It should be noted that the query includes the conditional expression Gender=Male, which is in conflict with the conditional constraint expression Gender!=Male. At this point, the user is not aware of this conflict and pushes the Continue button 602, thereby submitting the query to the query execution runtime 160. As with the previous example, the query execution component 160 analyzes the input abstract query seen in free-form text box 701A and presents the screen illustrated in FIG. 7B.

The query execution component 160 determines which fields are in the conditional portion of the submitted abstract query (e.g., Test A Results and Gender) and then determines if conditional constraints are defined for these fields. The query execution component determines that the conditional constraint expression for Test A Results, Gender!=Male, is in conflict with the second conditional expression of the query, Gender=Male. If both the expressions, Gender=Male and Gender!=Male, are included in the query, there would be an empty result set—meaning that no records are returned. Therefore a dialog box 702 displaying a warning is provided to inform the user that the two expressions "Test A Results=200" and "Gender=Male" together produces an empty result set.

Each of the conditional constraints described above depend on correlations between logical fields at particular values. In one embodiment, a series of queries are issued and the corresponding query results are analyzed to identify correlations between distinct values of all logical fields. For instance suppose that Test A Results and Test B Results are fields in the DAM and the values of Test A Results range from 200-220, and Test B Results has values that range from 1-3. A check for correlations is performed between Test A Result of 200 and Test B Result of 1, Test A Result of 200 and Test B Result of 2, and Test A Result of 200 and Test B Result of 3. If there is a correlation between Test A Result and Test B Result for any particular combination of values, a conditional constraint is defined for Test A Results based on that correlation. If, for instance, every time Test A Result is 200 the Test B Result is 2 a conditional constraint would be built between Test A Result and Test B Result for the values of 200 and 2, respectively. This process is then repeated to check for a correlation between each value of Test A Result (200-220) and Test B Result (1-3). Similarly, embodiments of the present invention may be configured to check for correlations between distinct values for all logical fields in the DAM 150.

Figure 8:
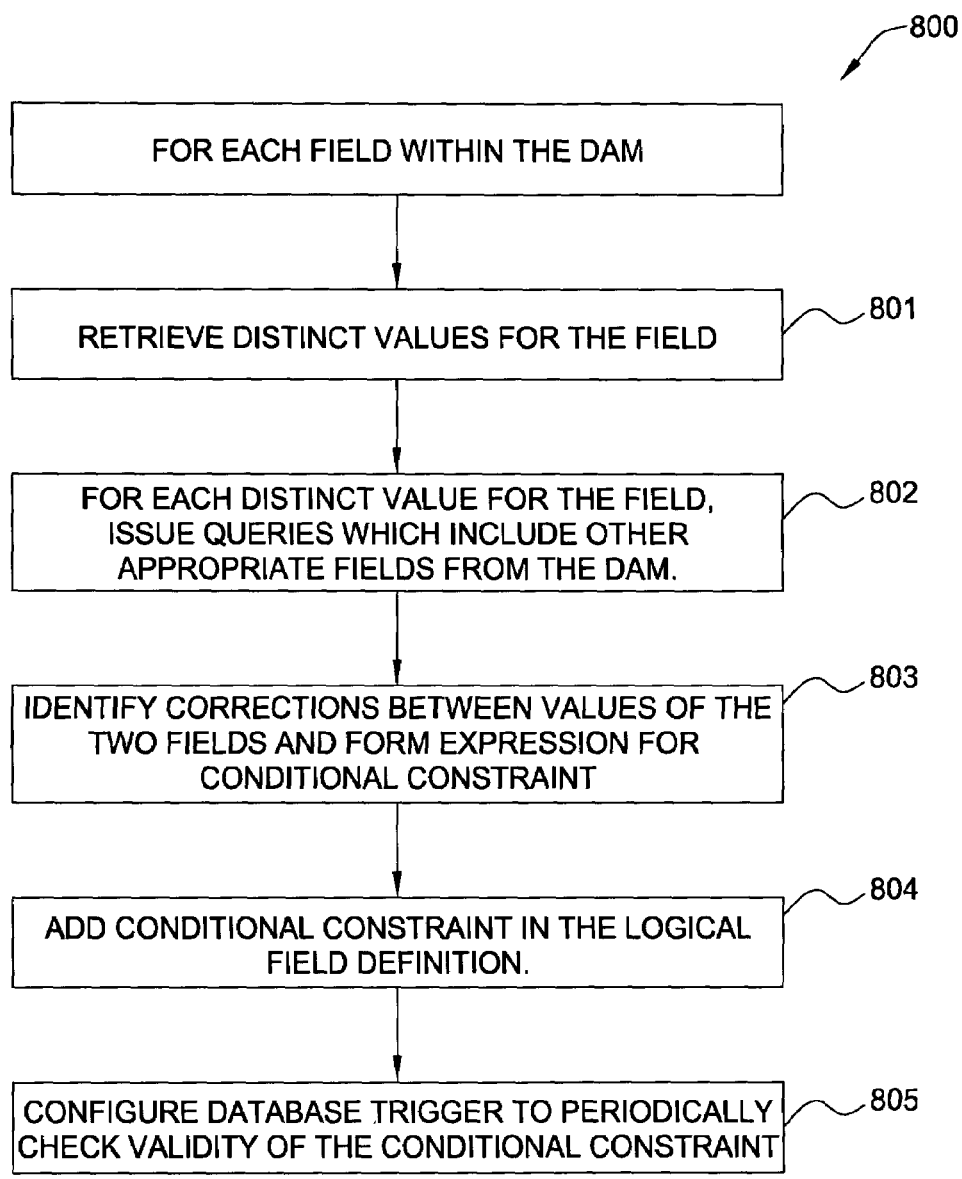
FIG. 8 is a flow chart illustrating steps for identifying correlations and bui

FIG. 8 is a flow chart illustrating operations 800 for identifying correlations and building conditional constraints between logical fields in the DAM 150. For each field in the DAM, the following steps are performed. At step 801, a set of distinct values is retrieved for the current field. For instance, for Test B Results the distinct values would be: 1, 2 and 3. Next, at step 802, for each distinct value for the field, queries which include other fields (or referenced fields) in the DAM are issued. For example, for the Test B Result value of 1, queries are issued against Test A Results (e.g., Find: Test A Results, Under Conditions: Test B Results=1). At step 803 the results corresponding to the issued queries are analyzed to determine if correlations can be made between values of the two fields. If a correlation can be made, at step 804, a corresponding conditional constraint is added for the current field (e.g., Test B Results).

In some embodiments, at step 805 a database trigger is created to ensure the validity of the conditional constraint. While database triggers are described, it should be understood that in other embodiments, programmatic components other than database triggers (e.g., Java components) may be used to remove conditional constraints. Step 805 is particularly useful in environments where data within the data repository is constantly changing (e.g., transactional databases). Database triggers can be used to manage conditional constraints. If, for instance, data is entered that is not consistent with the correlation on which the conditional constraint is based, a database trigger will remove the conditional constraint. In this way, users are assured that as long as the conditional constraint is in place the correlation on which it is based is still valid.

For example, suppose a correlation exists between Test A Result=200 and Test B Result=2. A conditional constraint would be built based on that correlation. If particular data is entered for Test A Results or Test B Results that violates that correlation (e.g., an entry where Test A Results=200 and Test B Results=3), an "on update" trigger can be configured to remove the conditional constraint between Test A Results and Test B Results. In abstract terms, the trigger definition may include the following instructions: if (Test A Results=200) and (Test B Results!=2) then remove conditional constraint for Test A Results.

Performing operations 800 to find correlations between all distinct values of a particular field with distinct values of other logical fields also facilitates conditional constraints that are based on multiple values or a range of values. For instance, a conditional constraint can be created for Test A Results based on the following expression: Test B Results NOT IN (4, 5, 6). In other words, the expression specifies that Test B Results!=4 and Test B Results!=5 and Test B Results!=6. Using the NOT IN expression in the manner shown is convenient and provides the ability to incorporate a range of values within one conditional constraint expression. Similarly, conditional constraint expressions can be built using the IN keyword.

CONCLUSION

Embodiments of the present invention provide a process for constructing abstract queries which can be converted to optimized physical queries. Abstract queries are constructed with logical fields configured with conditional constraints. Conditional constraints allow for valuable correlations to be made between logical fields; the correlations allow for optimized physical queries to be generated from corresponding abstract queries.

While the expressions in the examples above have included the equal operator (=), it should be understood that embodiments of the present invention also support the use of other operators, such as greater than and less than. In other words, conditional expressions and conditional constraint expressions may contain any of the operators listed above (e.g., =, !=, <, >, etc).

While the examples above have included conditional constraints based on correlations between two logical fields, embodiments of the present invention can be configured to provide conditional constraints that are based on more than two logical fields. Further, conditional constraints can be configured to provide two or more conditional constraint expressions, wherein the two or more expressions can contain two or more distinct logical fields.

Many of the example queries described above present fields and records from two tables within a single database. However, those skilled in the art will recognize the methods described herein may be used with logical fields which source data from multiple tables which may be located in various databases in a distributed database environment.

The foregoing examples reference medical research environments. However, these examples are provided merely to illustrate embodiments and particular implementations. More broadly, embodiments of the invention are contemplated for any data environment including, for example, transactional environments, financial research environments, accounting environments, legal environments and the like.

While the foregoing is directed to embodiments of the present invention, other and further embodiments of the present invention may be devised without departing from the basic scope thereof, and the scope thereof is determined by the claims that follow.

What is claimed is:

1. A computer implemented method for retrieving data, comprising:
providing a plurality of conditional constraints, wherein each constraint is programmatically generated by execution of a constraint generation routine that performs a constraint generation operation, comprising:
issuing a first query to retrieve distinct values for a first field;
receiving results for the first query, the results comprising the distinct values for the first field;
for each of the distinct values for the first field,
issuing a second query configured to retrieve, for a second field, a result set that satisfies a first condition comprising the first field related to the distinct value by an operator;
determining whether a correlation exists between (i) the respective distinct value of the first field and (ii) a respective result set value of the second field; and
if a correlation exists, defining a conditional constraint for the first field based on the correlation, wherein the conditional constraint specifies the addition of a second condition to a query if the query includes the respective first condition, wherein the second condition includes the second field related to the respective result set value by an operator;
receiving a query;
for each conditional constraint of the plurality of conditional constraints:
determining whether the query satisfies the conditional constraint; and if the query satisfies the conditional constraint, adding the respective second condition corresponding to the satisfied conditional constraint to the query to produce a modified query;

executing the modified query; and returning results for the modified query.

2. The computer implemented method of claim 1, further comprising:

determining whether the modified query satisfies at least one conditional constraint of the plurality of conditional constraints; and if so, adding the respective second condition corresponding to the at least one conditional constraint to the modified query to produce another modified query.

3. The computer implemented method of claim 1, wherein the query is an abstract query defined according to logical fields having respective definitions in a data abstraction model, each respective definition comprising a field name, a location parameter indicating a locations of a counterpart physical field and a reference to an access method configured to access the physical field according to the location parameter.

4. The computer implemented method of claim 1, further comprising, for each of the plurality of conditional constraints:

determining whether the respective correlation is violated by a data entry; and if the respective correlation is violated, removing the conditional constraint for which the respective correlation is violated.

5. The computer implemented method of claim 1, wherein the respective second conditions are complex conditions and comprise a plurality of individual conditions related by operators.

* * * * *